(12) United States Patent
Tu

(10) Patent No.: US 11,051,558 B2
(45) Date of Patent: Jul. 6, 2021

(54) UNBURNED TOBACCO CONTROLLER IN TRUE RESPONSE TO SMOKER'S PUFF PROCESS

(71) Applicant: Xiangzheng Tu, San Jose, CA (US)

(72) Inventor: Xiangzheng Tu, San Jose, CA (US)

( * ) Notice: Subject to any disclaimer, the term of this patent is extended or adjusted under 35 U.S.C. 154(b) by 346 days.

(21) Appl. No.: 16/260,132

(22) Filed: Jan. 29, 2019

(65) Prior Publication Data

US 2020/0237017 A1 Jul. 30, 2020

(51) Int. Cl.
| | | |
|---|---|---|
| *A24F 47/00* | (2020.01) | |
| *H04W 4/80* | (2018.01) | |
| *A24F 9/00* | (2006.01) | |
| *A24F 13/00* | (2006.01) | |

(52) U.S. Cl.
CPC ............ *A24F 47/008* (2013.01); *A24F 9/00* (2013.01); *A24F 13/00* (2013.01); *H04W 4/80* (2018.02)

(58) Field of Classification Search
CPC .......... A24F 40/50; A24F 40/51; A24F 40/53; A24F 47/008
See application file for complete search history.

(56) References Cited

U.S. PATENT DOCUMENTS

| | | | | |
|---|---|---|---|---|
| 2004/0031497 | A1* | 2/2004 | Likness | A24F 40/65 |
| | | | | 131/270 |
| 2019/0087302 | A1* | 3/2019 | Smith | A24F 47/008 |
| 2019/0142067 | A1* | 5/2019 | Martzel | A61M 15/06 |
| | | | | 131/329 |
| 2019/0274354 | A1* | 9/2019 | Sur | H05B 3/44 |

FOREIGN PATENT DOCUMENTS

EP 2488054 B1 4/2013

OTHER PUBLICATIONS

M. Gilchrist, "The IQOS heating system," in the slides of Philip Morris International's Presentation before the Tobacco Products Scientific Advisory Committee, Jan. 24, 2018.

* cited by examiner

*Primary Examiner* — Eric Yaary
(74) *Attorney, Agent, or Firm* — JW Law Group; James M. Wu

(57) ABSTRACT

The present invention relates to an unburned tobacco controller in true response to smoker's puff process. The unburned tobacco controller comprises a MEMS thermal flow sensor and a microcontroller. With the thermal flow sensor, the controller can duplicate a whole smoker's puff process including puff start, puff stop, single puff duration, single puff volume, single puff interval, total puff volume, total puff duration, total puff interval and total puff number. The microcontroller with several embedded programs so that a tobacco roll can be heated to release nicotine-contained smokes meeting the habits and needs of the smoker and making the smoker feel, sense and experience like a conventional tobacco product.

31 Claims, 5 Drawing Sheets

"UNBURNED TOBACCO CONTROLLER IN TRUE RESPONSE TO SMOKER'S PUFF PROCESS"

FIELD OF THE INVENTION

The present invention relates to an unburned tobacco controller in true response to smoker's puff process, more particularly related to an unburned tobacco controller able to duplicate and personalize the whole smoker's puff process.

BACKGROUND

Unburned tobacco products, as the name suggests, they heat tobacco but don't burn them. Unlike e-cigarettes, use nicotine-laced liquid, heat-not-burn products use real tobacco. They warm tobacco sticks to a temperature that's high enough to release an aerosol but not enough to cause combustion. They may significantly reduce risk while satisfying users' nicotine cravings.

In order to earn consumer acceptance as an alternative to conventional tobacco products, the unburned tobacco product should be able to generate a similar experience to conventional tobacco products. An aspect of the experience of smoking a conventional tobacco product is the so-called "puff profile", also referred to as the "puff per puff profile". This is the amount of total particulate matter yield in each puff as the smoking tobacco is consumed. The total particulate matter delivery of a conventional smoking tobacco product is relatively low during the first couple of puffs, but it tends to gradually increase right through to the final puffs. This gives the smoking the sensation of the smoke gradually increasing in strength.

Smoking machines have been used to compare delivered dose among different tobacco products which measure and record smoking topography i.e., puff volume, puff interval, puff duration, and air flow. The smoking machines did not provide a means to access the time-resolved continuous puffing data, but instead produced summary topography data for each puff, i.e., puff volume, duration, and flow. Because smoker's smoke differently as the tobacco rod is consumed, individual smoking puffing behavior is rarely uniform.

European patent number EP2488054B1 and titled as "Control of puff profile" relates to heat not burn products. The products comprise an encapsulated aerosol generating agent, the encapsulation having the effect of controlling the release of the agent during use of the heat not burn product. The encapsulation will control the timing of the release of the aerosol generating agent during the use of the heat not burn product, to allow greater control of the puff yield. In the case of some aerosol generating agents, the encapsulation may also increase the stability of the agent and/or prevent its migration within the product.

Reference to "Script and Slides of Philip Morris International's Presentation before the Tobacco Products Scientific Advisory Committee (TPSAC), 24 Jan. 2018", Philip Morris International provided unburned cigarettes called IQOS which is a tobacco heating system with three main components—a heated tobacco plug an IQOS holder, and a charger. The holder contains a heating blade that heats the tobacco plug from the inside. The blade has a platinum based heating track that's coated with a thin film of glass. The heating blade is connected to a printed circuit board that hosts the firmware for temperature control. When it's in use, the average temperature across the blade is no more than 350 degrees Celsius—that's 662 degrees in Fahrenheit. A cigarette, on the other hand, burns at about twelve hundred degrees Fahrenheit. The heating blade is also a sensor that continually monitors tobacco temperature. The energy supply is automatically cut off if it detects temperatures above the set limit. Every single heating blade is individually calibrated to ensure precision and reliability over and over again during the course of the product's lifecycle. They use infrared cameras to measure the average blade temperature at different set points. Those temperatures are correlated to specific electrical parameters that are unique to each blade and are store in the permanent memory of the device. Based on these parameters, the device software precisely regulates the energy supplied to the heating blade to achieve the desired temperature profile. The holder supplies heat to the heated tobacco plug via the heating blade for six minutes or 14 puffs.

Such unburned tobacco products have been made in an effort to counteract the foregoing negative aspects of smoking. However, these products have only provided limited solutions often at the expense of commercial success or consumer acceptance since they lack the normal feel and sensation of smoking a traditional cigarette and involve complicated designs resulting in higher costs for manufacturers and consumers alike.

Furthermore, the emissions data obtained on the unburned tobacco products by some researchers have been shown that the percentage of nicotine released under the 14 puffs was only 18% of the blend nicotine. It was estimated that under the experimental conditions used the tobacco plug half life times would be of approximately 50 puffs for nicotine and 2-300 puffs for tobacco-specific nitrosamines under 200° C. heating conditions.

It would be desirable to provide an unburned tobacco controller that can measure a topography profile of a whole smoker's puff process. The controller comprises a thermal flow sensor for measuring the puff air flow profile generated by a whole smoker's puff process in real-time which includes puff start, each puff air flow rate, each puff duration, each puff volume, each puff interval, total puff volume, total puff time, and puff stop, and a programmed microcontroller used to collect and process the signals of the thermal flow sensor and drive a heater for heating a tobacco roll resulting nicotine contained smoke emissions which duplicates the puff air flow profile and makes the smoker feel, sense and experience like a conventional tobacco product.

SUMMARY OF THE DISCLOSURE

One main feature of the present invention is to provide an unburned tobacco controller that can duplicate a topography profile of a whole smoker's puff process. The controller comprises a thermal flow sensor for measuring the puff air flow profile generated by the whole smoker's puff process in real-time which includes puff start, single puff duration time, singe puff volume, puff interval, total puff volume, total puff duration time, total interval time puff stop, and total puff number. The controller further comprises a microcontroller with several embedded programs so that a tobacco roll can be heated to release nicotine-contained smokes meeting the habits and needs of the smoker and making the smoker feel, sense and experience like a conventional tobacco product.

Another feature is that the thermal flow sensor is produced by MEMS (Microelectromechanical systems) which is composed of a central heater source (micro heater) and two temperature sensors (thermopiles), which are placed symmetrically upstream and downstream of the micro-heater. If no gas flows over the sensor surface, the symmetric thermopiles measure the same rise in temperature, resulting in the same output voltage of the two thermopiles. If a non-zero gas flows from the inlet to the outlet of the meter, the velocity of a fully-developed laminar air flow unbalances the temperature profile around the heater and heat is transferred from upstream thermopiles to the downstream thermopiles, causing a change in the voltages of the thermopiles. Larger gas flow rates result in larger asymmetry in the temperature profile.

Still another feature is that the controller comprising a housing a first housing molded to have an air flow tube with a shrank portion sandwiched between two straight portions wherein the tobacco roll with the heater is disposed in a straight portion and the sensor with the microcontroller is disposed on the inside wall of the shrank portion. A laminar air flow is configured to pass through the shrank portion and measured by the thermal flow sensor.

Still another feature is that the controller comprising a second housing which is molded to have a main air flow tube with both the tobacco roll and the heater therein and a bypass air flow tube with both the thermal flow sensor therein. A laminar air flow is configured to pass through the bypass air flow tube and measured by the thermal flow sensor so as to calculate the air flow rate through the main air flow tube using a known fluid mechanics formula.

Still another feature is that when a buttery is connected to the heater the microprocessor will converts the intensity of the electronic signal produced by each puff into a PWM signal which modulates the buttery voltage for driving the tobacco roll to release nicotine-contained smokes according to the puff air profile.

Still another feature is that when the intensity of each puff air flow profile is measured by the thermal flow sensor the converted PWM signal can be used to compensate the temperature drop of the heated tobacco roll due to the cooling effect of the puff air flow.

Still another feature is that the microcontroller is programmed to counter each interval time between two successive puffs and when the interval time is less than a predetermined time the heater will be controlled at a minimum heated temperature level waiting for a subsequent puff to come so as to increase the heated temperature of the heater for driving the tobacco roll to release a nicotine contained smoke according to the whole smoker's puff air profile otherwise the heater will be stop so as finish the whole smoker's puff process.

Still another feature is that the microcontroller can be programmed: 1) to turn on a switch of the battery for the heater to be heated as a the first puff of the whole smoker's puff process is to come; 2) to increase heated temperature until the tobacco roll is up to a predetermined higher temperature level; 3) to increase heated temperature until the tobacco roll is down to a predetermined lower temperature level; to maintain heated temperature to be at the predetermined lower temperature level.

Still another feature is that the microcontroller is configured to comprise a display device for the smoker to view his whole puff process in real time.

Still another feature is that the microcontroller is configured to communicate with a smart phone so as to record, read and analyze the whole smoker's puff process for several purposes.

BRIEF DESCRIPTION OF THE FIGURES

Figure 1:
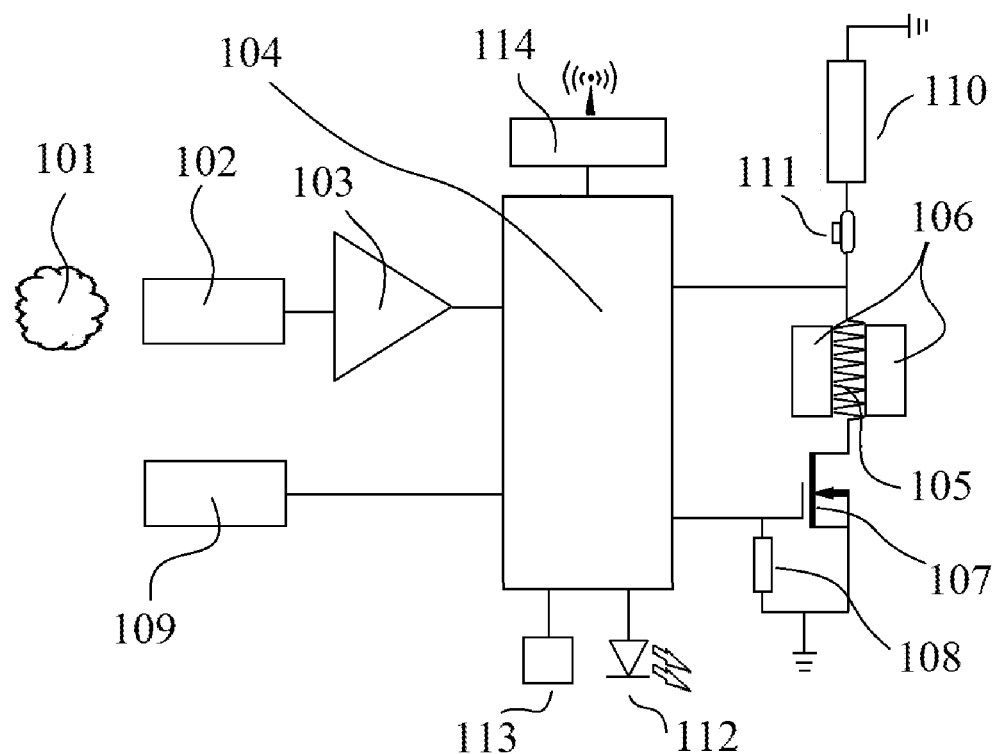

Having thus described the present invention in the foregoing general terms, reference will now be made to the accompanying drawings, which are not necessarily drawn to scale, and wherein:

FIG. 1 is a schematic diagram illustrating an unburned tobacco controller in true response to smoker's puff process according to the present invention.

Figure 2:
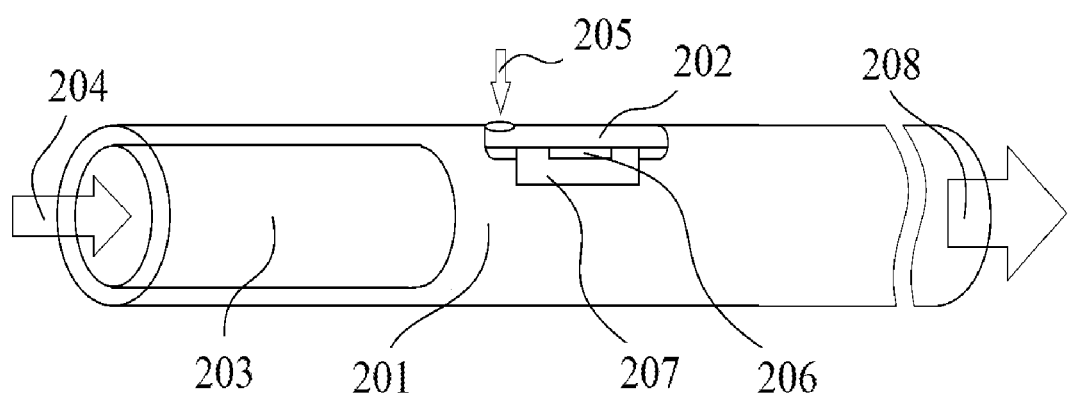

FIG. 2 is a schematic diagram illustrating a first housing of the unburned tobacco controller in true response to smoker's puff process according to the present invention.

Figure 3:
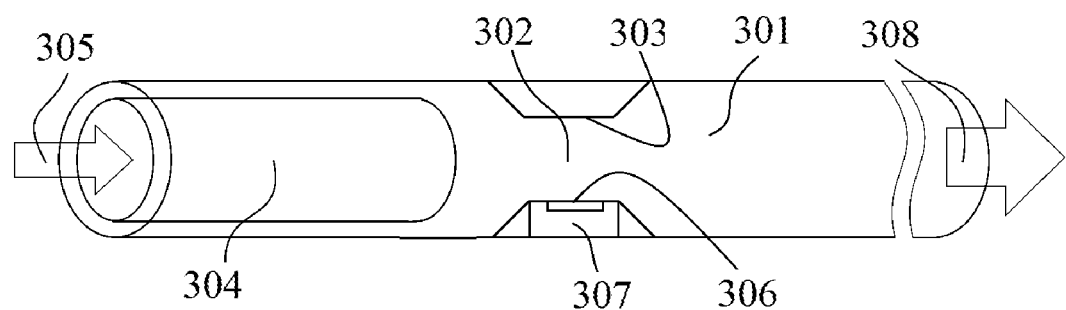

FIG. 3 is a schematic diagram illustrating a second housing of the unburned tobacco controller in true response to smoker's puff process according to the present invention.

Figure 4:
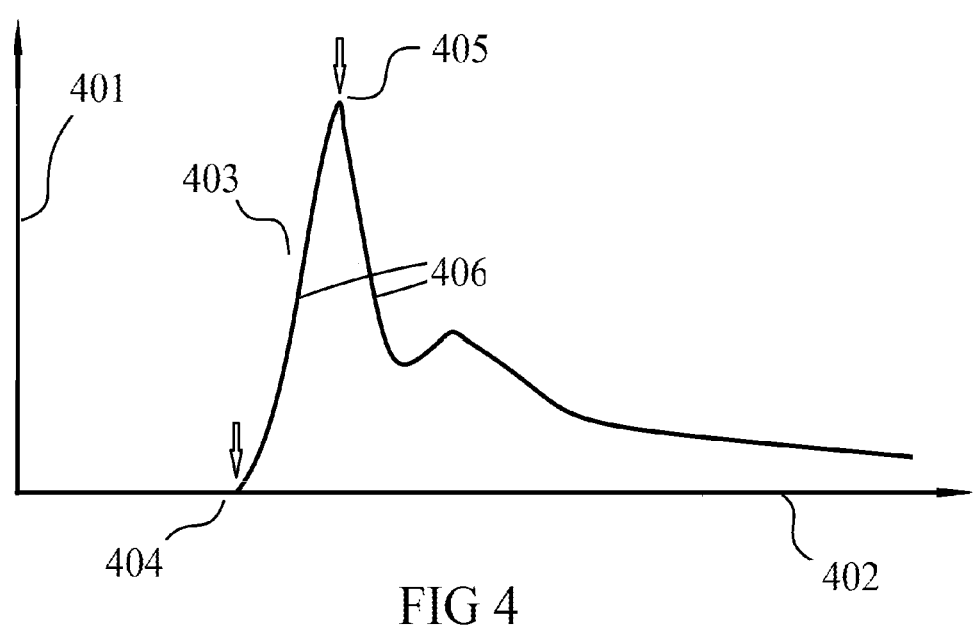

FIG. 4 is a graph showing the nicotine emission rate of a tobacco roll as a function of heated temperatures according to the present invention.

Figure 5:
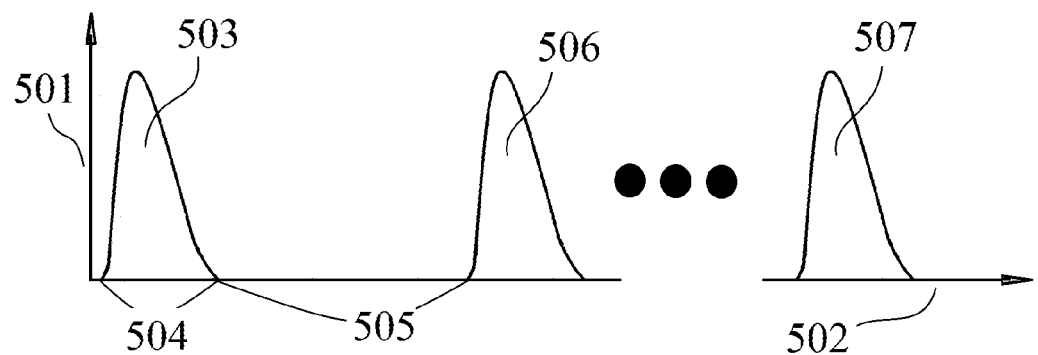

FIG. 5 is a graph showing the puff air flow profile along a whole smoker's puff process according to the present invention.

Figures 6A, 6B, 6C:
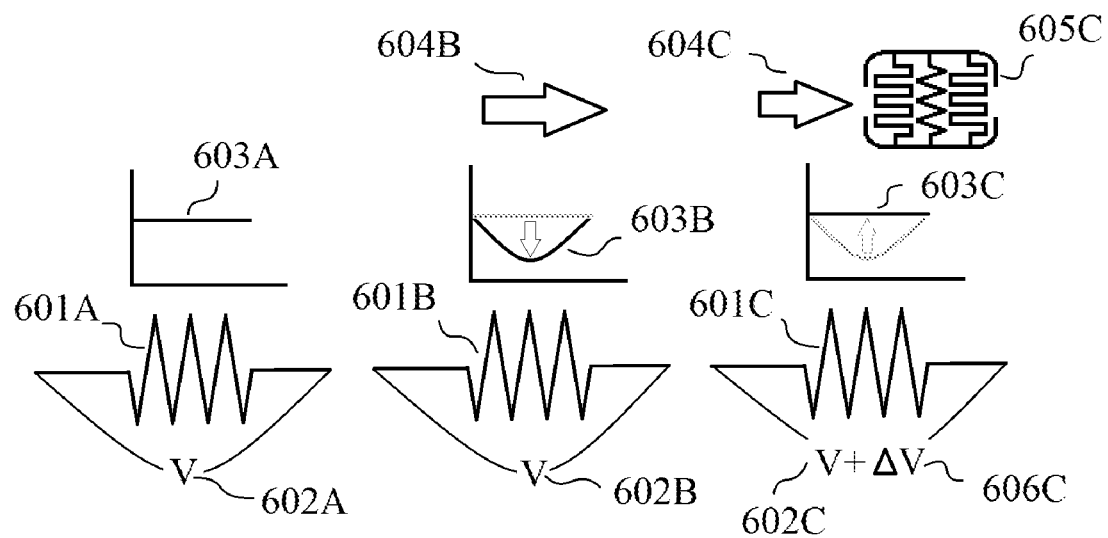

FIG. 6A, FIG. 6B and FIG. 6C are graphs showing a thermal flow sensor to measure puff air flow profile for compensating the temperature drop of the heated tobacco role caused by the cooling effect of puff air flows according to the present invention.

Figure 7:
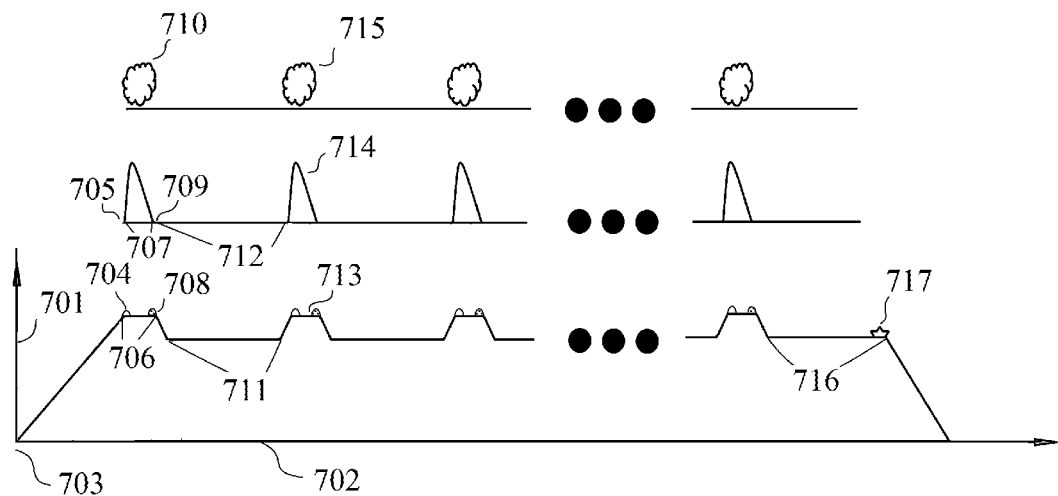

FIG. 7 is a graph showing a first high and low alternative heating temperature profile created by an embodied program of the microcontroller according to the present invention.

Figure 8:
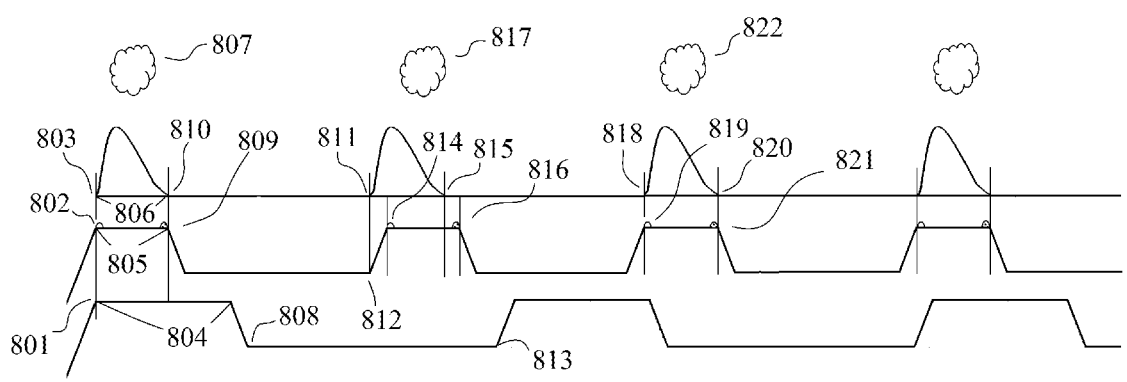

FIG. 8 is a graph showing a second high and low alternative heating temperature profile created by a self-learning program embedded in the microcontroller according to the present invention.

Figure 9:
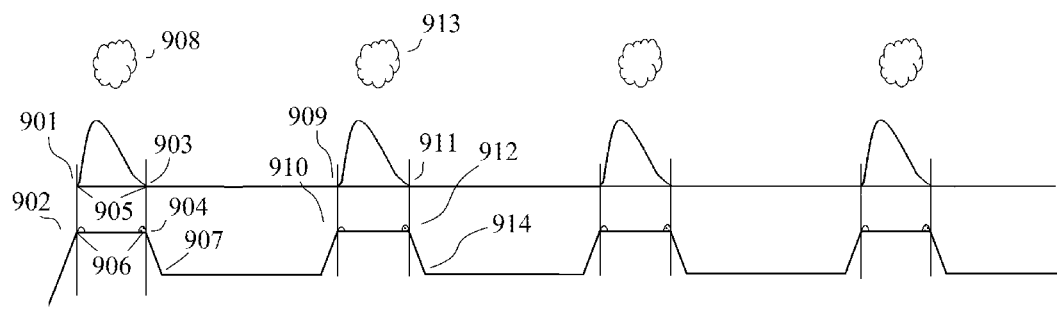

FIG. 9 is a graph showing a third high and low alternative heating temperature profile created by a personalized program embedded in the microcontroller according to the present invention.

Figure 10:
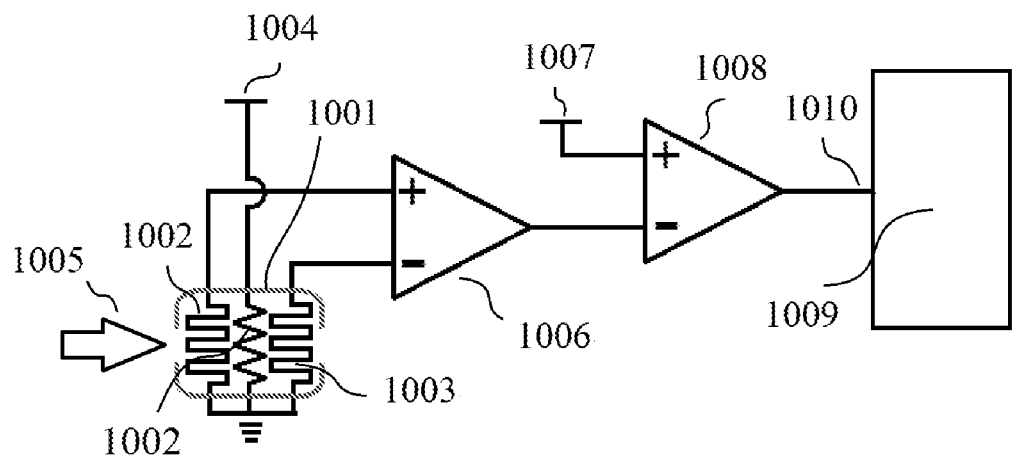

FIG. 10 is a schematic diagram showing a wake detector for waking up a microcontroller from sleep mode according to the present invention.

DETAILED DESCRIPTION

Some detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein. Example embodiments are described herein with reference to some figures that are schematic illustrations of idealized embodiments of example embodiments. As such, variations from the shapes of the figures are to be expected. Thus, example embodiments should not be construed as limited to the shapes of regions illustrated herein but are to include deviations in shapes. Thus, the figures are schematic in nature and their shapes are not intended to illustrate the actual shape a device and are not intended to limit the scope of example embodiments.

An unburned tobacco controller in true response to smoker's puff process is provided by the present embodiment(s) of the invention.

As shown in the FIG. 1, the unburned tobacco controller in true response to smoker's puff process comprises puff air flow profile 101 generated by a whole smoker's puff process, a MEMS thermal flow sensor 102 measuring the puff air flow rate profile, a pre-amplifier 103 conditioning the output signals of the thermal flow sensor, a microcontroller 104 converting the conditioned signals into digital signals and processing the digital signals for control application, a heater 105 controlled by the microcontroller, a tobacco roll 106 release nicotine contained smokes driven by the heater, a FET transistor 107 used as a switch for the microcontroller to control the heater, a resistor 108 working with the EFT transistor, a temperature sensor 109 used to measure the temperature of the heater, a battery 110 providing heating voltage to the heater, a hand switch 111 for the switching battery on and off, at least one light emitting diode (LED) 112 for sending the signals relating to the puff process to the smoker, an electronic display 113 used to display the output signals of the microcontroller in video, and a wireless transmitter 114 for displaying the output signals of the microcontroller on a smart-phone.

The unburned tobacco controller in true response to smoker's puff process further comprises a metal housing. As shown in the FIG. 2, the metal housing consists of a main air flow tube 201, a bypass air flow tube 202, a tobacco roll 203, a main air flow 204, a bypass air flow 205, a thermal flow sensor 206, an electronic board 207 and a smoke air flow 208.

The main air flow tube and the bypass air flow tube are modeled to have a bypass configuration. Thermal flow sensor relies on the ability of fluid flows to affect thermal phenomenon by way of heat transfer that, in turn, is transferred into a varying electrical signal capturing the sensor response to flow change. The sensor is thermally isolated so only heat transfer due to flow can occur. Other heat transfer pathways such as through substrate or electrical leads have been minimized in the device design. Since the bypass air flow tube is a capillary tube and has a small Reynolds number so that the bypass air flow is a fully developed laminar air flow. It should be noted that the principle of operation of the thermal flow sensor is restricted to be used for laminar flow. Since the Thermal flow sensor is commonly installed in a pipe or a duct, this restriction is easy to be meted. When a smoker makes a puff to the housing the outside air enters the housing through both the main air flow tube as a main air flow and the bypass air flow tube as a bypass flow. Both the air flows are converged before enter the smoking month. Using this bypass configuration helps to minimize electric power consumption and to increase the speed of response of the controller. It also allows for the controller elements to be molded and assembled independently of the sensor.

As an alternative, the unburned tobacco controller in true response to smoker's puff process further comprises another metal housing. Reference to the FIG. 3, the metal housing comprises an air flow tube 301, a shrank portion 302 of the air flow tube, an inside wall 303 of the shrank portion, a tobacco roll 304, an air flow 205, a thermal flow sensor 306, an electronic board 307 and a smoke flow 308. As said before, the sensor is thermally isolated so only heat transfer due to flow can occur. Other heat transfer pathways such as through substrate or electrical leads have been minimized in the device design. When a smoker makes a puff to the housing the outside air enters the housing through the tobacco roll. The tobacco roll can convert a turbulent flow into a laminar flow by separating it into an array of thin, parallel channels. So a laminar air flow comes out form the tobacco roll and passes through the thermal flow sensor so as to cause the sensor to output an electric signal.

FIG. 4 shows nicotine emission curve of a heated tobacco roll as a function of heated temperature.

It has been reported that in order to measure nicotine emission rate a tobacco roll was manufactured into a cigarette form. The filter of the cigarette was removed as its presence would have introduced the possible presence of filter components into the aerosol. The remaining tobacco roll was inserted into a quartz tube furnace. A resistant wire is rounded the outside of the tube so that the tobacco roll can be heated uniformly. The heated temperature is controlled by a microcontroller and monitored by a thermocouple inserted into the tube. In this way the heated temperature profile of the tobacco roll can be controlled precisely and uniformly. The aerosol generated by the heated tobacco roll was analyzed by thermogravimetric analysis (TGA).

In the FIG. 4, the vertical axis 401 of a coordinate system represents the nicotine emission rate and the horizontal axis 402 represents the tobacco roll heating temperature. Number 403 indicates the rising temperature gradient of a nicotine release curve, number 404 indicates the staring temperature of the nicotine release curve, number 405 indicates the maximum tempera of the nicotine release curve, number 406 indicates the half peak width of the nicotine release curve. As can be seen, the main portion of the nicotine emission curve is a bell shape.

Reference to the FIG. 4, across the whole heated temperature range the nicotine emission curve only has a steep emission, the peak temperature is about 194° C. and the full width of half peak is about 120° C. That means for nicotine emission purpose the heated temperature of the tobacco roll should be controlled in the range of the full width of the half peak. The peak temperature is in the range of 200° C. to 210° C. and the valley temperature is in the range of 130° C. to 140° C.

Back to the FIG. 1, according to the present invention a tobacco roll is heated by a heater which is inserted into the roll along the central line of the roll. The heater is a thin film resistor and disposed on a thin ceramic plate. On the plate there is also disposed a thin film resistance temperature sensor. The heated temperature of the roll can be measured by the temperature sensor and controlled by the output signal of the microcontroller. It should be known that the heated temperature along the radical direction of the roll is a gradient profile. In order to control the heated temperature of the roll an average temperature is needed to be defined. For easy measurement the average temperature is set at the half point of the radius of the roll. The measurement can be made with a micron thermocouple which is inserted into the roll from the outside end along a direction parallel to the axial of the tobacco roll. It should be noted that the heated temperature of the heater is not allowed to be higher than 350° C. by the control of the microcontroller so as keep the roll to be unburned. The heating process will automatically stop when the heated temperature of the roll is over the set limit. Actually, when the heater is heated up to the 350° C. the average temperature of the roll is still in the range of 200 to 250° C. This is because a finished tobacco is not good thermal conduction material. It is possible to build a relationship curve between the average heated temperature of the tobacco rolls and the heated temperature of the heater when the tobacco rolls are manufactured basically the same. Then the relationship curve can be used to derivate the average heated temperature of the roll from the heated temperature of the heater.

The FIG. 5 shows a puff air flow profile along a whole smoker's puff process. The puff air flow profile is measured by a MEMS thermal flow sensor provided by POSIFA Microsystems Company. MEMS technology is amenable to creating micro-heaters and thermal sensors with no moving parts, thus simplifying fabrication and operational requirements. Other advantages of the MEMS thermal flow sensors are small size, short response time, low power consumption, higher sensitivity to low flow rates.

The thermal flow sensor is fabricated using MEMS technology and configured to have a central micro heater and two thermopiles, which are placed symmetrically upstream and downstream of the micro-heater. If no gas flows over the sensor surface, the symmetric thermopiles measure the same rise in temperature, resulting in the same output voltage of the two thermopiles. If a non-zero gas flows from the inlet to the outlet of the meter, the velocity of a fully-developed laminar air flow unbalances the temperature profile around the heater and heat is transferred from upstream thermopiles to the downstream thermopiles, causing a change in the voltages of the thermopiles. Larger gas flow rates result in larger asymmetry in the temperature profile.

As shown in the FIG. 5, number 501 represents the vertical axis, which indicates the puff air flow profile measured by the thermal flow sensor. Number 502 represents the horizontal axis, which indicates the time for conducting of a whole smoker's puff process. Number 503 indicates the first puff air flow profile made by the first puff of the whole smoker's puff process. Number 504 indicates the first puff duration time. 505 indicates the first interval duration time between the first puff and a subsequent puff. Number 506 indicates the second puff air flow profile. Number 507 indicates the last puff air flow profile.

When a whole smoker's puff process is started the tobacco, roll is heated so as to release nicotine contained smokes. The flow rate of each puff air flow can be measured by the thermal flow sensor and converted to a PWM signal for modulating the buttery voltage which is used to heat the heater. Therefore, the heated temperature of the tobacco roll embodies the effects of the intensity of the puff air flow and can be used to compensate the cooling effect of the puff air flow.

The microcontroller can be operated to digitize the output signal from the oscillator, to process the data measured by the thermal flow sensor, to control the heating circuit of the heater based on the processed data, to story and output the processed data.

During the whole smoker's puff process the microcontroller can actuate the timer to count the duration time of each puff of the whole smoker's puff process and store the data in the memory, the interval time between two puffs and store the data in the memory.

During the whole smoker's puff process the microcontroller can actuate the CPU to integrate the puff air volume for each puff, the total puff air volume for the whole smoker's puff process.

During the whole smoker's puff process the microcontroller can actuate the CPU to average each puff duration time and each interval time for the whole smoker's puff process and store the data in the memory.

When the last puff interval time counted is longer than a preset puff interval time the microcontroller can stop heating of the heater and light a LED for telling the smoker to switch the battery off.

Reference to the FIG. 6A, number 601A indicate a heater, number 602A indicates a starting battery voltage used to heat the heater, number 603A indicates the temperature profile of a tobacco roll to be heated. Reference to the FIG. 6B, number 601B indicates a heater, number 602B indicates a starting battery voltage used to heat the tobacco roll, number 603B indicates the temperature drop of the tobacco roll to be heated which is caused by the cooling effect of the puff air flow which passes through the tobacco roll. In Reference to the FIG. 6C, number 601C indicates a heater, number 602C indicates a starting battery voltage and number 603C indicates an additional voltage generated by the thermal flow sensor which is used to measure a puff air flow and convert an output signal for a microcontroller to control heating of the heater.

As shown in the FIG. 6A when there is no puff air flow passing through the tobacco roll the tobacco roll will maintain at a constant heated temperature. As shown in the FIG. 6B when a puff air flow passes through the tobacco roll the heated temperature of the tobacco roll will decrease due to the cooling effect of the puff air flow. This situation will change when an output signal of the thermal flow sensor sends to the microcontroller as shown in the FIG. 6C. The microcontroller can produce a corresponding PWM output to the heater for increasing the heating voltage of the tobacco roll so as to compensate the heated temperature drop of the tobacco roll and maintain the tobacco roll at the original heated temperature.

FIG. 7 shows a high and low alternative heated temperature profile created by the first embodied program of the microcontroller. This program is set for an average whole smoker's puff process. To run the program a tobacco roll is heated by applying a constant battery voltage to the heater and produces a serial of nicotine contained smokes for the smoker to puff. When a puff air flow passes through the tobacco roll there are two responses can be seen at the same time. One is to reduce the heated temperature of the tobacco roll due to the cooling effect of the puff air flow. The other is an additional voltage applying to the heater which is generated by the output signal of a thermal flow sensor so as to compensate the reduced heated temperature of the tobacco roll.

During the whole smoker's puff process the microcontroller also conducts other functions including integrating or calculation of each puff volume and total puff volume, each puff duration time and total puff duration time, each interval time and total interval time, and total puff number and total duration time of the whole smoker's puff process.

As shown in the FIG. 7, number 701 indicates the vertical axis representing the average tobacco roll temperature profile of a heated tobacco roll. Number 702 indicates the horizontal axis representing the time course of a whole smoker's puff process. Number 703 indicates the starting point of a high and low heated temperature profile within a whole smoker's puff process which actually indicates a room temperature. Number 704 indicates the starting point of the first preset high heating temperature profile which allows a tobacco roll to be heated high enough for release of a nicotine-contained smoke and a LED to be lighted to signal to the smoker for making the first puff. The time from number 703 to number 704 is for warm up the tobacco roll which is set to be about 20 second depending upon the nature of the used tobacco roll. Number 705 indicates the starting point of the first puff air flow profile which is measured by a thermal flow sensor. Number 706 indicates the duration time of the first preset high heating temperature profile, Number 707 indicates the duration time of the first puff air flow profile. It preferred that the duration time 706 of the high heating temperature profile of the tobacco roll is longer than the duration time 707 of the first puff air flow profile. This is to allow the smoker to have enough time for making the first puff. Number 708 indicates the end point of the high heating temperature profile and a LED to be lighted to signal to the smoker to stop puff and be waiting for making of the second puff. Number 709 indicates the end point of the first puff air flow profile. Number 710 indicates the first nicotine-contained smoke profile which responses to the first puff air flow profile. Number 711 indicates the duration time of the first preset low heating temperature profile. Number 712 indicates the interval time between the first puff air flow profile and the second puff air profile. 713,714 and 715 indicate the second-high heating temperature profile, the second puff air flow profile and the second nicotine-contained smoke profile. Number 716 indicates the duration time of the last low heating temperature profile which is longer than the duration time of the first preset low heating temperature profile duration time. Number 717 indicates a LED to be lighted to signal to the smoker for switching off of the battery. So far, the whole smoker's puff process is completely finished.

It has been reported that for an average smoker the puff duration time is about 2 the second and the interval duration time is about 30 the second. In above mentioned the first high and low heating temperature profile the puff duration time can be set to be 3 to 5 the second. Even at the starting point of a high heating temperature profile a LED is lighted the smoker may still not response immediately for some reason. It is the best way to set the puff duration time little longer. Within the longer duration time smoker can make a puff freer.

FIG. 8 shows a high and low alternative heating temperature profile created by the second program embedded in the microcontroller. This program has self-learning function. The first cycle of a preset high and low alternative heating profile is used for the microcontroller to know the behavior of a smoker and collect and extract the useful data from the behavior. Based on the extracted data the microcontroller automatically modulates the preset high and low alternative heating temperature profile so that the modulated high and low alternative heating temperature profile can truly response to the smoker's puff process. The behavior of the smoker can be tracked by the thermal flow sensor and converted into the output signals of the microcontroller which includes each puff air flow profile and all puff air profile, each puff air volume and total puff air volume, each puff duration time and total puff duration time, each interval time and total interval time, and total puff number and total duration time of the whole smoker's puff process.

Reference to the FIG. 8, number 801 indicates the starting point of the first preset high temperature heating profile, number 802 indicates the starting point of the first real high heating temperature profile and a LED to be lighted for telling the smoker to make the first puff, 803 indicates the starting point of the first puff air flow profile, 804 indicates the duration time of the first preset high heating temperature profile, 805 indicates the duration time of the first real high heating temperature profile, 806 indicates the duration time of the first puff air flow profile, 807 indicates the first nicotine-contained smoke profile, 808 indicates the starting point of the first preset low heating temperature profile, 809 indicates the end point of the first real high heating temperature profile and a LED to be lighted for telling the smoker to stop puff and be waiting for the next puff , 810 indicates the end point of the first puff air flow profile, 811 indicates the starting point of the second puff air flow profile, 812 indicates the transform point from the first real low heating temperature profile to the second real high heating temperature profile, 813 indicates the transform point from the first preset low heating temperature profile to the second preset high heating temperature profile, 814 indicates the starting point of the second real high heating temperature profile, 815 indicates the end point of the second puff air flow profile, 816 indicates the end point of the second real high heating temperature profile and a LED to be lighted for waiting to make the second puff , 817 indicates the second nicotine-contained smoke profile, 818 indicates starting point of the third puff air flow profile, 819 indicated the starting point of the third real high heating temperature profile and a LED to be lighted for telling the smoker to make the second puff, 820 indicates the end point of the third puff air flow profile, 821 indicated the end point of the third real high heating temperature profile and a LED to be lighted for waiting for the third puff to be made, 822 indicates the third nicotine-contained smoke profile.

It is preferred that the duration time of the first preset high heating temperature profile is set to be 3 to 5 the second which is longer than an average real puff duration time and the duration time of the first interval is set to be 25 to 35 the second which is in the range of an average real interval duration time. And the first real puff duration time is the same as the duration time of the first puff air flow profile. The starting point of the second puff air flow profile is the same as the initial point for raising the second-high heating temperature profile but earlier than the starting point of the second-high heating temperature profile. This is because the high heating temperature profile is driven by the second puff air flow profile and the interval duration is counted from the end point of the first puff air flow profile instead of the starting point of the preset low alternative heating temperature profile. As said before the first cycle of the high and low heating temperature profile is used for the microcontroller to learn how to create a real high and low alternative heating temperature profile for the smoker. According to the extracted data the microcontroller will repeat a modulated high and low alternative heating temperature profile for all the subsequent cycles. That means that the real high and low alternative heating temperature profile is driven by the puff air flow profile and both the profiles are all synchronized if the smoker does not change his puff behavior during the process and the preset high and low alternative heating temperature profile is no longer used.

When the last modulated interval duration time is over and there is no a puff air flow signal coming the microcontroller will light a LED for the smoker to turn off the buttery voltage and finish the whole smoker's puff process.

FIG. 9 shows a high and low alternative heating temperature profile created by the third program embedded in the microcontroller. This program is used to personalize the high and low alternative heating temperature profile according to the puff behavior of the smoker. The personalized high and low alternative heating temperature profile can make a tobacco roll release nicotine contained smokes to be really wanted by a smoker. Of course, the embedded program is developed and modulated based on the collected and exacted the data related to the puff behavior of the smoker who has been using the controller. The related date consists of several parameters of the smoker puff process such as puff volumes, durations, intervals and so on. Since the repeatability and consistency of the smoker's puff behavior the developed and modulated program can response to the smoker's puff process very well.

Reference to the FIG. 9, number 901 indicates the starting point of the first puff air flow profile, number 902 indicates the starting point of the first high heating temperature profile and a LED to be lighted for the smoker to make the first puff, number 903 indicated the end point of the first puff air flow profile, number 904 indicates the end point of the first high heating temperature profile and a LED to be lighted for waiting to make the second puff, 905 indicates the duration time of the first puff air flow profile, number 906 indicates the duration time of the first high heating temperature profile, number 907 indicates the starting point of low heating temperature profile, 908 indicates the first nicotine-contained smoke to be released, 909 indicates the starting point of the second puff air flow profile, number 910 indicates the starting point of the second high heating temperature profile and a LED to be lighted for the smoker to make the second puff, 911 indicates the end point of the second puff air flow profile, 912 indicates the end point of the second high heating temperature profile and a LED to be lighted for waiting of the third puff to be made, 913 indicates the second nicotine-contained smoke to be released, 914 indicates the starting point of the second low heating temperature profile.

As can be seen from the FIG. 9, each puff air flow profile, each high heating temperature profile and each nicotine contained smoke profile are all happen at the same time. But the sequence in which they are happen is that the high heating temperature profile is first and the puff air flow profile and the nicotine contained smoke profile is last.

FIG. 10 shows the block diagram of a wake detector circuit which wakes up a microcontroller from its low current sleep state, saving power while anticipating an event which must be processed.

In the FIG. 10, number 1001 indicates a thermal flow sensor, number 1002 indicates a heater of the sensor, number 1003 indicates a thermopile, 1004 indicates a voltage applied to the heater, 1005 indicates a puff air flow, 1006 indicates an amplifier, 1007 indicates a comparator, 1008 indicates a voltage applied to the comparator, 1009 indicates a microcontroller, 1010 indicates a general purpose I/O port of the microcontroller.

It can be seen from the FIG. 10 that the wake detector circuit consists of a thermal flow sensor, an amplifier and a comparator. The output voltage of the thermal flow sensor is used as an initial wake up signal for the detector. After amplified by the amplifier the output voltage sends to the comparator for comparing with a reference voltage. When the amplified voltage is larger than the reference voltage the comparator outputs a digital number "1" to a general purpose I/O port of the microcontroller. Then the microcontroller will be waked up or come back to the normal operation mode.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. An unburned tobacco controller for a smoker's puff process comprising:
    a whole puff air flow profile containing series of single puff air flow profile which is generated by a whole smoker's puff process including puff start, puff stop, single puff duration, single puff volume, single puff interval, total puff volume, total puff duration, total puff interval and total puff number;
    a thermal flow sensor sensing and quantifying the single and whole puff air flow profile(s) and outputting the generated electronic signals;
    a microcontroller including a switch, a battery, a preamplifier, a central processing unit (CPU), a timer, a memory, a comparator, an analog/digital converter (ADC) and a pulse width modulation (PWM), at least a light releasing diode (LED) and a variety of embedded programs and instructions for operating the CPU;
    a heater controlled by the CPU according to the signals measured by the thermal flow sensor; and
    a temperature sensor measuring the heated temperature of the heater, and a tobacco roll heated by the heat for releasing a single and a whole nicotine-contained smoke profile(s).

2. The unburned tobacco controller of claim 1, wherein the controller further comprises a housing molded to have an air flow tube with a shrank portion sandwiched between two straight portions wherein the tobacco roll with the heater is disposed in a straight portion and the sensor with the microcontroller is disposed on a circuit board and installed on the inside wall of the shrank portion.

3. The unburned tobacco controller of claim 1, wherein the controller further comprises a housing molded to have a main air flow tube with the tobacco roll and a bypass air flow tube with the heater, the thermal flow sensor and the microcontroller therein in which the sensor and the microcontroller are disposed on a circuit board installed on the inside wall of the bypass tube.

4. The unburned tobacco controller of claim 2, wherein a laminar air flow is built to pass through the shrank portion of the tube and the thermal flow sensor measures the puff air flow profile(s) which is used to calculate the puff air flow rate through the tobacco roll.

5. The unburned tobacco controller of claim 3, wherein a laminar air flow is built to pass through the bypass air flow tube and the thermal flow sensor measures the puff air flow rate which is used to calculate the air flow rate through the tobacco roll.

6. The unburned tobacco controller of claim 1, wherein the thermal flow sensor is fabricated using a MEMS technology and configured to have a central micro heater and two thermopiles, which are placed symmetrically upstream and downstream of the micro-heater so that If no gas flows over the sensor surface the symmetric thermopiles measure the same rise in temperature, resulting in the same output voltage of the two thermopiles and If a non-zero gas flows from the inlet to the outlet of the meter, the velocity of a fully-developed laminar air flow unbalances the temperature profile around the heater and heat is transferred from upstream thermopiles to the downstream thermopiles, causing a change in the voltages of the thermopiles.

7. The unburned tobacco controller of claim 1, wherein when the smoker's puff process is started and the tobacco roll is heated to a preset heated temperature for releasing a nicotine-contained smoke the intensity of each puff air flow profile can be measured by the thermal flow sensor and converted to a PWM signal for modulating the buttery voltage which is used to heat the heater so that the heated temperature of the tobacco roll can be compensated for the cooling effect of the puff air flow.

8. The unburned tobacco controller of claim 1, wherein when the whole smoker's puff process is conducted the microcontroller can actuate the timer to count the duration time of each puff air flow profile and storage the counted data in the memory.

9. The unburned tobacco controller of claim 1, wherein when the whole smoker's puff process is conducted the microcontroller can actuate the timer to count the interval time between two continuously happen puffs and storage the counted data in the memory.

10. The unburned tobacco controller of claim 1, wherein when the whole smoker's puff process is conducted the microcontroller can actuate timer to count the total puff number and store the counted data in the memory.

11. The unburned tobacco controller of claim 1, wherein when the whole smoker's puff process is conducted the microcontroller can actuate the CPU to integrate each puff volume and store the integrated data in the memory.

12. The unburned tobacco controller of claim 1, wherein the whole smoker puff process is conducted the microcontroller can actuate the CPU to integrate the total puff volume and store the counted data in the memory.

13. The unburned tobacco controller of claim 1, wherein the microcontroller can actuate the CPU to average the puff duration time for the whole smoker's puff process and store the averaged data in the memory.

14. The unburned tobacco controller of claim 1, wherein the microcontroller can actuate the CPU to average the interval time for the whole smoker's puff process and store the averaged data in the memory.

15. The unburned tobacco controller of claim 1, wherein when the whole smoker's puff process is conducted the microcontroller can actuated the comparator to compare the puff interval time with a preset interval time and when the former is longer than the latter the battery will be switched off and the whole smoker puff process is finished.

16. The unburned tobacco controller of claim 1, wherein when the whole smoker's puff process is conducted the microcontroller can run a first embedded program to create a high and low alternative heating temperature profile applied to a tobacco roll, the high heating temperature profile is set for the smoker to make puffs and its staring point and ending point are marked by a lighted LED, the low heating temperature profile is set for the smoker to make intervals.

17. The unburned tobacco controller of claim 16, wherein the high heating temperature profile of the tobacco roll is for releasing maximum nicotine-contained smokes and can be set in the range of 180 to 240° C.

18. The unburned tobacco controller of claim 16, wherein the low heating temperature profile of the tobacco roll is for releasing minimum nicotine-contained smokes and can be set in the range of 120 to 140° C.

19. The unburned tobacco controller of claim 16, wherein the duration time of each puff of the whole smoker's puff process can be set in the range of 3-5 the second.

20. The unburned tobacco controller of claim 16, wherein the interval time between two continues happen puffs for the whole smoker's puff process can be set in the range of 25-35 second.

21. The unburned tobacco controller of claim 16, wherein when the last interval duration time is longer than 25-35 second the battery will be switched off and the whole smoker puff process is finished.

22. The unburned tobacco controller of claim 1, wherein the microcontroller can run a second embedded program for a high and low alternative heating temperature profile applied to a tobacco roll, the program has a self-learning function so that after a first puff is over the puff duration time is recoded and after the first interval is over the interval duration time is recorded and the subsequent high and low alternative heating temperature profile is conducted according to the recoded puff duration time and interval duration time.

23. The unburned tobacco controller of claim 21, wherein the first puff duration time can be set in the range of 3 to 5 the second.

24. The unburned tobacco controller of claim 21, wherein the first interval duration time can be set in the range of 25 to 35 second.

25. The unburned tobacco controller of claim 16, wherein when the last interval duration time is longer than 25-35 second a LED will be lighted and the battery will be switched off so as to finish the whole smoker's puff process.

26. The unburned tobacco controller of claim 1, wherein the microcontroller can run a third embedded program to create a high and low alternative heating temperature profile applied to a tobacco roll so that the high and low alternative heating temperature profile is personalized and therefore the tobacco roll can release nicotine-contained smokes to meet the habits and needs of the smoker.

27. The unburned tobacco controller of claim 1, wherein in order to minimize the power consumption the microcontroller can be placed in sleep mode so that the normal operation of the microcontroller is suspended and the clock oscillator is switched off, however, the Input and output (I/O) ports maintain the status they had before.

28. The unburned tobacco controller of claim 27, wherein the sleep mode of the microcontroller can be woken up by the output signal of the thermal flow sensor which is configured to be an air flow switch circuit comprising of a thermal flow sensor, a preamplifier and a comparator.

29. The unburned tobacco controller of claim 27, wherein the output signal of the thermal flow sensor can be generated by the first puff of the whole smoker's puff process.

30. The unburned tobacco controller of claim 1, wherein the controller further comprises an electronic display which is used to show the data measured by the thermal flow sensor and processed by the microcontroller for the smoker to read, study and analysis the whole smoker's puff process.

31. The unburned tobacco controller of claim 1, wherein the controller further comprises a blue-tooth transceiver which is used to send the data measured by the thermal flow sensor and processed by the microcontroller to a smartphone using multiple wireless protocols for the smoker to read, study and analysis the whole smoker's puff process.

* * * * *